May 24, 1960     Y. A. YOLER     2,937,523
FLUID FLOW GENERATORS
Filed March 13, 1956
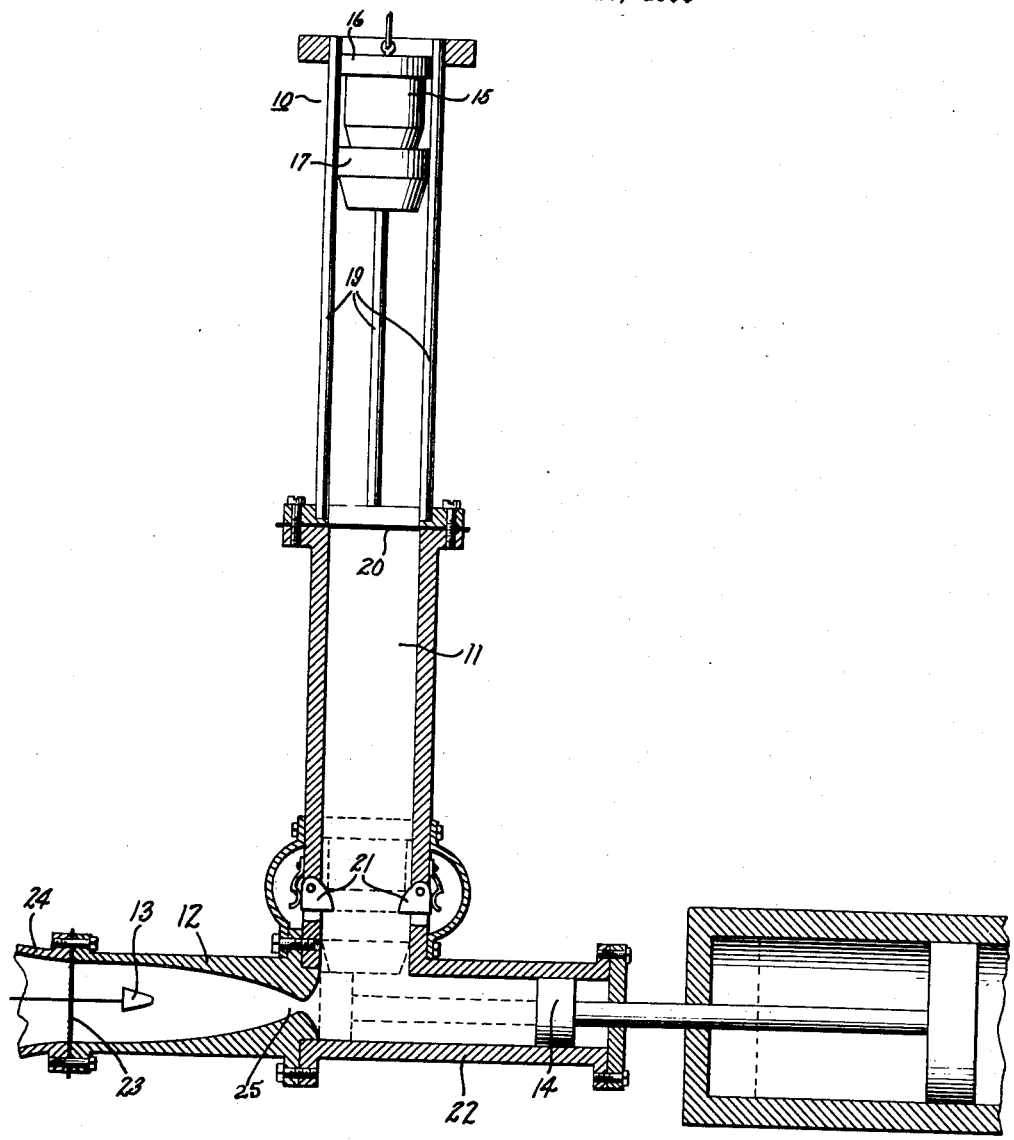
Inventor
Yusuf A. Yoler
by Alfred B Levine
His Attorney

United States Patent Office 2,937,523
Patented May 24, 1960

2,937,523

FLUID FLOW GENERATORS

Yusuf A. Yoler, Schenectady, N.Y., assignor to General Electric Company, a corporation of New York Filed Mar. 13, 1956, Ser. No. 571,298

9 Claims. (Cl. 73—147)

This invention generally relates to improvements in fluid flow generators and more particularly to generators for transmitting fluids at high speeds and temperatures over model vehicles at rest to simulate certain conditions existing when such vehicles travel through the fluid at high speed.

Known fluid flow generators for this purpose may be generally classified into three types; the continuously operating wind tunnels generating fluids at relatively low speeds and temperatures, the very short duration shock tunnels generating fluids at extremely high temperatures and speeds, and the intermediate duration blow-down tunnels, to which the present invention is directed, operating for longer durations than the shock tunnel arrangements and generating fluid flow at generally higher speeds and temperatures than the wind tunnels.

However, to obtain high temperatures and speeds of fluid flow in the known blow-down tunnel arrangements requires elaborate and expensive heating and compressing apparatus to initially heat and compress large quantities of the fluid before releasing this fluid through an expansion nozzle to flow over a stationary flight model. Furthermore, the storage of this energy in such a vast quantity of fluid takes a considerably longer time than the duration of fluid flow over the model during the test. For example, in the usual apparatus of this type the heaters and compressors are operated for a period of hours to enable the generation of fluid flow for but a period of seconds. Additionally, undesirable variations in the speed and temperature of flow occur during the test, since the expansion and flow of the fluid over the model lowers the temperature and pressure of the remaining fluid within the reservoir thereby progressively lowering the speed and temperature of the released fluid flowing over the model.

To overcome these disadvantages in accordance with the present invention, there is provided a blow-down type tunnel employing a unique rapidly operating means that simultaneously heats and compresses a fluid within a reservoir in a relatively short time and thereafter enables this fluid to expand and flow in a stream over the model in such a manner that the temperature and pressure within the reservoir remains substantially constant during the flow process. By simultaneously heating and compressing the fluid in a relatively short time interval, the present invention considerably decreases the time between successive operations of the device providing a tunnel of greater utility, while concurrently eliminating the cost and complexity of the elaborate compressors and heating devices heretofore employed. Additionally, by maintaining the pressure and temperature of the continuously diminishing reservoir of fluid at substantially constant conditions as a stream of this fluid is being directed over the model, the flow speed and temperature are also maintained substantially constant during the test rather than varying as in the prior devices.

It is accordingly one object of the present invention to provide an improved generator for transmitting fluids at relatively high speeds and temperatures over a relatively long-time duration.

Another object of the present invention is to provide a device of this nature that is both less expensive and less complex to construct and operate than prior known devices.

Another object of the present invention is to provide a generator for transmitting fluids at temperatures, speeds, and durations not obtainable with prior known devices.

Still another object of the present invention is to provide a fluid flow generator for transmitting fluids at certain speeds, temperatures, and time durations and requiring considerably less time in being conditioned for operation than prior known devices.

Other objects and many attendant advantages will be more readily comprehended by those skilled in the art upon a detailed consideration of the following specification taken with the accompanying drawing depicting one preferred embodiment of the present invention, in section.

Referring now to the drawing for a detailed consideration of one preferred embodiment of the invention, there is shown a means, which may be a member 10, as shown, adapted to rapidly compress a stagnant fluid within a cylinder 11 to a condition of high temperature and pressure. Opening from this cylinder is at least one energy converting nozzle, generally designated 12, for the purpose of converting this highly compressed and heated stagnant fluid within the cylinder to high velocity flow over a stationary model 13 positioned within the nozzle 12. As this compressed and heated fluid leaves the cylinder reservoir 11 and passes through the nozzle to be converted into high velocity flow over the model 13, a piston 14 continuously reduces the volume within the cylinder 11 at such a rate that the volume of fluid passing through the nozzle 12 equals the volume of fluid displaced by piston 14. Otherwise stated, the mass flow rate of gas into the nozzle equals the mass displaced by the second piston 14. Consequently, the pressure-volume-temperature condition of the fluid within cylinder 11 is maintained substantially constant during the conversion of the stagnant compressed and heated fluid into the high velocity of flow, thereby maintaining substantially constant speed-temperature-flow conditions over the model 13.

Thus it is observed that there is provided a means for rapidly storing a great amount of energy within a stagnant fluid in the form of heat and compression and then converting this energy into high velocity flow of the fluid over a stationary model 13 in such a manner as to provide a substantially constant and uniform flow over the model as substantially all of this energy is converted. Otherwise stated, there is provided a means for rapidly storing energy in a fluid medium under stagnant conditions within a reservoir, and maintaining a diminishing reservoir of this fluid under the same stagnant conditions of heat and pressure as controllable portions of this fluid are continuously converted into high velocity flow over a model.

As shown, the preferred member 10 may be comprised of a weighted member 15 sandwiched between upper and lower cylindrically shaped piston members 16 and 17 that are adapted to ride upwardly and downwardly within suitable guide rail members 19. Upon raising this weight member 10 to a predetermined height above the cylinder 11 and thereafter releasing this member 10, it falls toward the cylinder 11 guided by the bars 19, and thereafter enters the cylinder 11 after bursting a suitable diaphragm 20. By suitably adjusting the dimensional tolerances of the upper and lower pistons 16 and 17, member 10 can be made to greatly compress and heat the fluid, such as air, within the cylinder.

This fluid initially within the cylinder may be maintained under predetermined temperature and pressure conditions and isolated from the ambient air by means of the diaphragm 20, such that by changing the initial pressure and temperature of the air within the cylinder a range of stagnation conditions can be produced.

As this member 10 moves down its guide members 19 and enters the cylinder 11, it transfers kinetic energy into compression and heat of the gas within the cylinder. As this air is compressed by the falling member, it exerts a spring-like reaction force upon the member, such that after this gas is compressed to a minimum volume, at which position the member 10 has transferred all of its moving energy to the gas, the member normally tends to spring back upwardly along guide members. To prevent this from happening, the lowest point which the weighted member 10 normally reaches within the cylinder can be estimated theoretically and determined experimentally. Hence, by means of suitable latches or stops, generally designated 21, which may be spring depressed in but one direction as the member (dotted line position) passes them, this member may be stopped and held after passing the stops 21, thereby preventing the member from springing back and enabling the fluid within the cylinder 11 to be heated and compressed to a predetermined value.

To prevent any changes in the compression or temperature of the gas within the cylinder chamber 11 when this compressed gas commences to expand through the nozzle 12 and travel at high speed over the flight model 13, movement of the second piston 14 is preferably synchronized to gradually and continuously move to the left, within the substantially L-shaped extension chamber 22 leading into the cylinder 11, at such a speed that the mass of the gas displaced by the second piston 14 is equal to the mass of gas passing into the nozzle 12, thereby preserving the stagnation pressure-temperature condition within the cylinder 11 and L-shaped extension chamber 22 thereof.

To further regulate the conditions of flow by preventing any back pressure or gas flow back into the nozzle 12 from the outside ambient air, and to maintain the pressure within the nozzle 12 at a predetermined value, a second diaphragm 23 may be employed to initially seal the left-hand opening of the nozzle 12 from an evacuation tank 24 or other discharge container. If desired, this second diaphragm 23 may be positioned to initially seal the throat area 25 of the nozzle 12 enabling the nozzle 12 to be initially evacuated to a low vacuum for reducing the time lost during the flow starting process or the time between the compression of the gas within the cylinder and the commencement of flow from the cylinder into the nozzle. After the high speed flow has started, of course, the diaphragm 23 is ruptured by the moving gases.

As is now evident to those skilled in the art, the present invention provides a fluid flow generating device that can transmit fluids at speeds in the subsonic, sonic, supersonic, and hypersonic ranges, as desired. Thus, for example, employing a weighted member of 20 tons, and dropping this weight for a distance of 50 feet, results in work of 360,000 ft. lbs., which can be shown to compress a gas, such as air, to within the range of 5000 lbs. per sq. in. to 1000 lbs. per sq. in. and raise this gas to temperatures in the range of 2000° F. to 3000° F. This highly heated and compressed gas can then be expanded through a suitable nozzle to speeds in the range of Mach number 5 to Mach number 10, flowing over a time duration of from 5 seconds to 15 seconds. Consequently, it is evident that the present invention can transmit fluids at speeds and temperatures ranges exceeding those obtainable in a conventional wind tunnel, and yet provide these flows for a time duration far exceeding that obtainable with known shock tunnels. It is further evident to those skilled in the art that known blow-down tunnels capable of generating fluid flow under these ranges of conditions are vastly more expensive, more complex, and more time consuming to operate while at the same time not being capable of maintaining fluid flow under substantially constant flow conditions. Additionally, since the flow speed, compression, temperature, and other variables may be controlled by suitable adjustments in piston size, weight, and displacement as well as changes in the nozzle, second piston and the like, it is observed that the present invention provides a more versatile, inexpensive, and relatively simple means for generating a range of desired flow speeds, temperatures and durations that are not obtainable with known blow-down tunnel arrangements equivalent in complexity and cost.

Although many changes may be made by those skilled in the art in either the rapid means for imparting energy to the stagnant fluid by such means as substituting other mechanical or electromechanical means for the piston-weight gravity drop arrangement; as well as changes in the means for continuously diminishing the volume of the reservoir to maintain the pressure and temperature of the reservoir gas at a substantially constant level, it is believed obvious that such changes may be made without departing from the spirit and scope of this invention. Accordingly, this invention is to be considered as being limited only by the following claims appended hereto.

What is claimed is:

1. In a fluid generator, a container, means for rapidly heating and compressing a stagnant fluid within the container, venting means for converting the energy within the fluid in the form of heat and compression into high speed flow of the fluid, and means for continuously maintaining the compression and temperature of said fluid within the container at a substantially constant level during this conversion, said maintaining means including a means for continuously diminishing the volume of said container at substantially the same rate as the rate of converting said stagnant fluid into high speed flow.

2. In a fluid generator, a container, means for rapidly heating and compressing a stagnant fluid within said container to high temperature and pressure conditions, means for continuously venting and expanding portions of said compressed and heated fluid to continuously expel a stream of said fluid from the container at high speed, and means for continuously maintaining the pressure and temperature of the remaining portions of the fluid within the container at a substantially constant level, said maintaining means including a means for continuously diminishing the volume within the container at the same rate of expelling the stream of fluid, thereby maintaining a substantially constant speed of movement of said expelled fluid and a substantially constant temperature within the stream.

3. In a fluid generator, a container housing a stagnant fluid, means applying a predetermined force over a given distance to heat and compress the stagnant fluid within said container, means for continuously expanding and venting portions of said compressed and heated fluid to expel a stream of said fluid from the container at high speed, and means for continuously maintaining the pressure and temperature of the remaining portions of the fluid within the container at a substantially constant level as said fluid is expelled from the container.

4. In the apparatus of claim 3, said force applying means including a weighted member, and said container comprising a hollow member complementarily formed to permit the heating and compression of said fluid as the member is directed into the container.

5. In the apparatus of claim 4, said means for venting portions of said compressed fluid including at least one nozzle having an inlet opening from said container and an outlet for directing the fluid outside of said container.

6. In the apparatus of claim 5, the movement of said member into the container to compress and heat the fluid therein occurring in but a fraction of the time period of expelling said fluid in a stream outside of said container.

7. In a fluid generator, a container housing a fluid, a piston member movable within said container, means supported by said container for guiding said member into said container to heat and compress said fluid, a fluid expanding nozzle connected to said container and comprised of a body portion having an inlet and an outlet opening, said compressed and heated fluid being directable into the inlet and ejectable out of the outlet at high speed, and means for continuously diminishing the volume of said container at the same rate as said fluid being ejected.

8. In the apparatus of claim 7, said means for continuously diminishing the volume of said container including a second piston member reciprocally movable within said container.

9. In a fluid generator, a container, means for rapidly heating and compressing the stagnant fluid within the container, venting means for converting the energy in the form of heat and compression of said fluid into high speed flow of the fluid in a stream expelled from the container, and means including a piston reciprocally movable within said container for diminishing the volume of said container at the same rate as the rate of expelling the fluid from the container thereby maintaining the compression and temperature of said fluid within the container at a substantially constant level.

References Cited in the file of this patent

UNITED STATES PATENTS

| | | |
|---|---|---|
| 2,546,965 | Bodine | Apr. 3, 1951 |
| 2,662,393 | Rzasa | Dec. 15, 1953 |
| 2,696,105 | Mackas | Dec. 7, 1954 |
| 2,776,562 | Davie et al. | Jan. 8, 1957 |

FOREIGN PATENTS

| | | |
|---|---|---|
| 904,709 | Germany | Feb. 22, 1954 |